No. 676,003. Patented June 11, 1901.
L. S. KALLAJIAN.
BICYCLE.
(Application filed Dec. 22, 1900.)
(No Model.) 2 Sheets—Sheet 1.
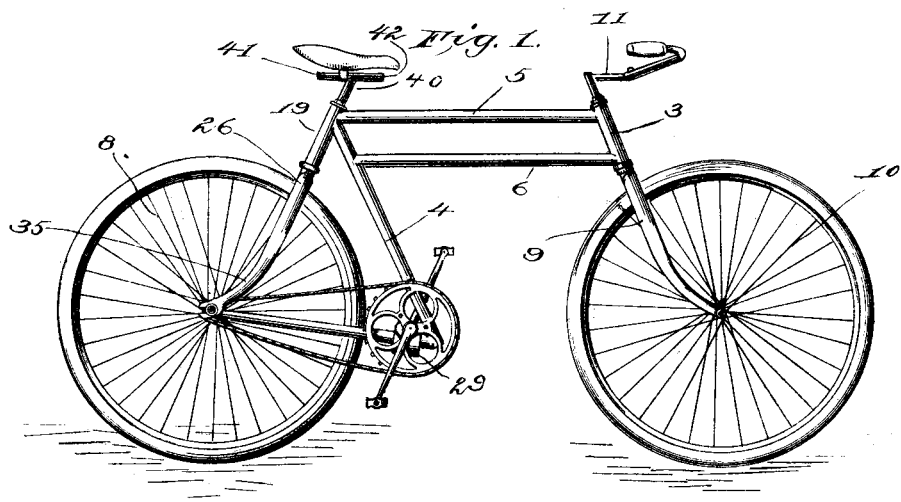
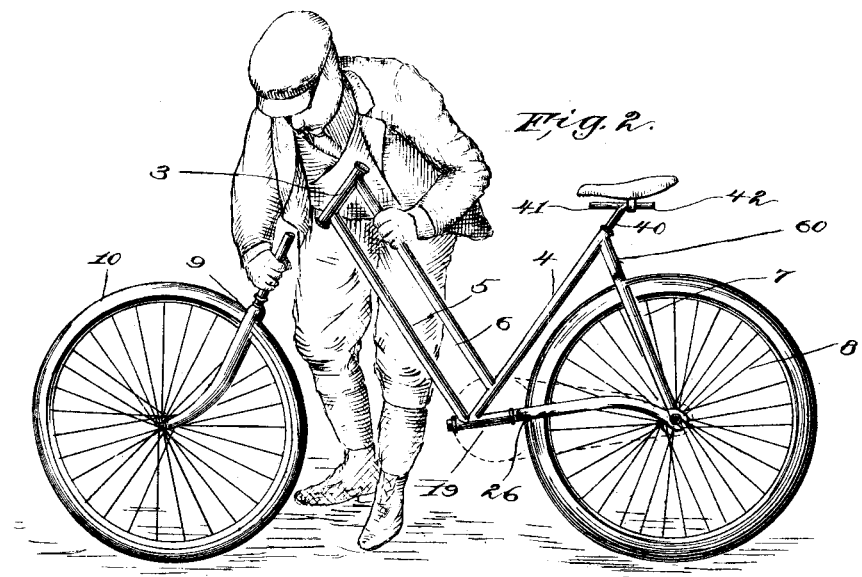
Witnesses.
W. C. Lunsford.
Thomas J. Drummond.
Inventor.
Lazarus S. Kallajian
by Crosby Gregory.
Atty's.

No. 676,003. Patented June 11, 1901.
L. S. KALLAJIAN.
BICYCLE.
(Application filed Dec. 22, 1900.)
(No Model.) 2 Sheets—Sheet 2.
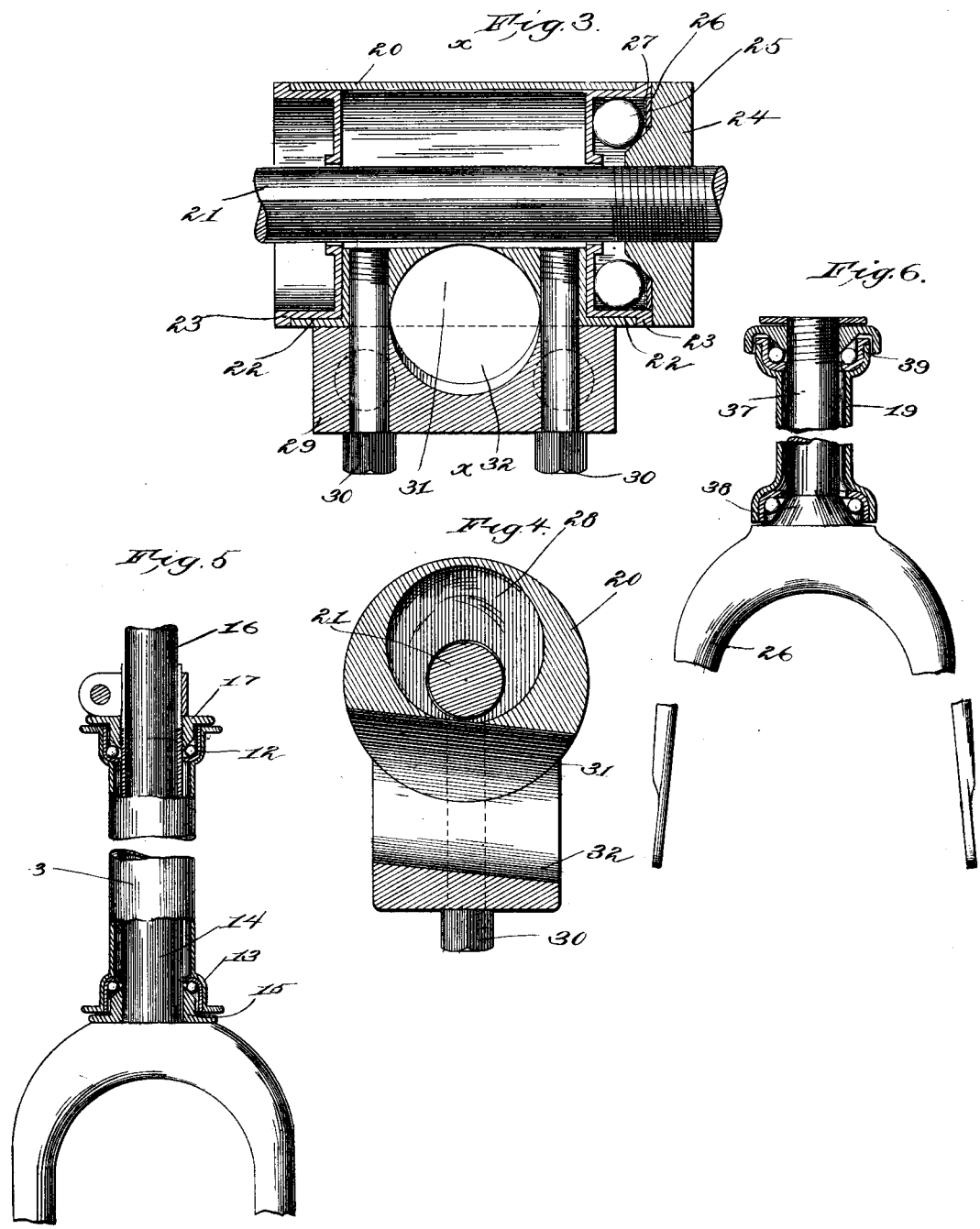
Witnesses.
W. C. Lunsford.
Thomas J. Drummond.
Inventor.
Lazarus S. Kallajian.
by Crosby & Gregory.
atty's.

UNITED STATES PATENT OFFICE.

LAZARUS S. KALLAJIAN, OF BOSTON, MASSACHUSETTS.

BICYCLE.

SPECIFICATION forming part of Letters Patent No. 676,003, dated June 11, 1901.

Application filed December 22, 1900. Serial No. 40,713. (No model.)

*To all whom it may concern:*

Be it known that I, LAZARUS S. KALLAJIAN, a citizen of the United States, residing at Boston, county of Suffolk, State of Massachusetts, have invented an Improvement in Bicycles, of which the following description, in connection with the accompanying drawings, is a specification, like letters on the drawings representing like parts.

This invention relates to bicycles, and has for one object to provide a novel form of bicycle-frame which may be readily converted from a gentleman's bicycle into a lady's bicycle by removing the front fork and wheel and reversing the same in the front head of the frame, the position of the crank-hanger being capable of being changed from one rear fork to the other rear fork, whereby when the frame is one side up it is a gentleman's frame and when the other side is up it is the proper shape for a lady's frame.

Another object of the invention is to provide a novel form of rear fork which is more resilient than forks commonly used, thus making the bicycle-frame more resilient and thus easier for the rider.

In the drawings, Figure 1 represents the bicycle with the frame in the proper position for use as a gentleman's bicycle. Fig. 2 shows the position of the frame when used as a lady's bicycle. Figs. 3 and 4 are details of the detachable crank-hanger, Fig. 4 being a section on the line $x\,x$, Fig. 3. Fig. 5 is a partial section of the front head with the front fork therein. Fig. 6 is a similar view of the rear head.

The bicycle-frame comprises the front head 3, the central post 4, which is connected to the front head by the top rail 5, and the two rear forks 26 and 7, the said rear forks being connected to the post 4 at opposite ends thereof and with the said post 4 forming the triangular frame, in which the rear wheel 8 is supported in the usual way.

As illustrated, the top rail 5 is duplicated in the brace 6, which runs parallel thereto and connects the post 4 with the head 3, this duplication of parts rendering the frame stronger, as will be readily understood.

The front fork 9 is of the usual construction, it carrying the front wheel 10 in the usual way.

The front head 3 of the frame is in the nature of a reversible head, and by "reversible" I mean reversible with reference to the front fork 9, the construction being such that by removing the handle-bars 11 the front fork 9 may be removed from the front head 3 and inserted therein from the top in Fig. 1, this construction enabling me to convert the frame of the bicycle from a gentleman's frame into a lady's frame, as will be presently described.

The front head 3 is of the usual construction in all particulars, except the top bearing 12, which is made of the same size as the lower bearing 13, this construction being necessary in order to reverse the fork 9 with reference to the head.

Fig. 5 shows a partial section through the front head, in which the fork 9 has the stem 14, carrying the cone 15 at the base of said stem, as usual in bicycles, the upper end of the said stem receiving the handle-bar post 16, which is clamped thereto in any approved way.

The construction of the upper bearing 12 of the head 3 is of the usual type, except as to its size, as stated above, it having the cone 17, which screws onto the upper end of the stem 14 of the front fork, said cone bearing on the usual antifriction-balls.

If desired, both bearings 13 and 14 may have the usual felt washers therein to make the said bearings dust-proof.

One form of detachable crank-hanger is shown in detail in Figs. 3 and 4, and it may either be clamped to the frame in the position shown in Fig. 1, in which case the frame is adapted for use as a gentleman's bicycle, or it may be clamped to the rear head 19 in the position shown in dotted lines in Fig. 2, this being the position of the crank-hanger when the bicycle is converted into a lady's bicycle. Referring now to Figs. 3 and 4, the said crank-hanger comprises the bearing-block 20, which may be of any suitable shape, it being shown as cylindrical, the said bearing-block being bored longitudinally thereof to receive the crank-shaft 21 and having its ends counterbored, as at 22, to receive the cups 23 for the antifriction-balls, which cups may be secured to the bearing-block in any approved way. The crank-shaft 21 will of course have the usual cones 24, secured thereto in some suitable way, which cones bear upon the antifriction-balls 25, and preferably the usual felt washer 26 and retaining-ring 27 will be employed, thus rendering the bearings dust-proof.

In order to render the bearing-block as light as possible and yet make the same of sufficient strength, I preferably make the longitudinal bore 28, which receives the crank-shaft 21, eccentric to the cylindrical bearing-block 20, as best seen in Fig. 4, while the counterbores 22, which receive cups 23, are concentric with the bearing-block, whereby the crank-shaft is properly centered when in place.

The crank-hanger or bearing-block is clamped to the frame by means of the clamping-block 29, which is secured to the bearing-block 20 by some suitable means, such as by bolts 30. The said bearing-block has a transverse half-round recess 31 in its lower side, the eccentric position of the bore 28 furnishing sufficient thickness on one side of the block for this recess, and the clamping-block 29 has a corresponding half-round recess at 32, the two recesses forming a seat of the proper proportions to fit the frame.

As will be readily understood, by turning up the bolts 30 the crank-hanger can be readily clamped to the frame in either one of its two positions and can be as readily removed therefrom by unscrewing the bolts 30.

It is sometimes desirable to vary the position of the crank-hanger by raising or lowering the same in order that the same frame may be used by riders of different sizes, and my detachable crank-hanger enables me to accomplish this. If desired, the said crank-hanger may be clamped to the lower end of the central post 4 instead of to the lower rear fork 7, in which case the sprocket-wheel would be brought nearer the seat-post, thus adapting the frame for the use of a boy. I may also place the crank-hanger on the lower rear fork 7, but in such a position that the cylindrical block 20 will be on the under side of the fork, this construction bringing the crank-shaft below said fork, which would be the position of the parts when it is desired to drop the crank-shaft as low as possible.

From the above description it will be seen that the crank-hanger is simple, strong, and of minimum weight, and can be readily attached to or detached from the frame and applied to the frame in a variety of positions.

As shown in Figs. 1 and 6, my improved bicycle-frame has a front and rear head, the rear head being designated by 19 and being of a construction similar to that of the front head. The front and rear heads have the same inclination to a vertical line, so that when used as a gentleman's bicycle the front and rear forks 9 and 26 have the same angle of inclination to the vertical. (See Fig. 1.)

In order to render the frame more resilient when in use, I preferably make the rear fork 26 curved at its lower end, as shown at 35, this curve being preferably of the same shape as the curve in the front fork 9, whereby both ends of the frame are similar in appearance.

As seen in Fig. 6, the rear fork 26 is a separate part from the head 19, the said fork having the hollow stem 37, on which are the cones 38 and 39, the said cones resting on antifriction-balls in the usual way, and the cone 39 being adjustably mounted upon the stem 37 to compensate for wear. Preferably the usual dust-washers will be used in these bearings. It will be understood, of course, that the rear fork 26 is held from turning in the rear head because the lower end thereof is clamped to the axle of the rear wheel, which is of course firmly held in the ends of the rigid fork 7, as usual in bicycles.

The hollow stem 37 of the rear fork affords means for supporting the seat-post 40 when the frame is used as a gentleman's frame, the seat-post being clamped in place in any usual way. The advantage of this manner of securing the seat in the frame is that as the seat is elevated it is carried forward or farther over the pedals, while in the ordinary construction, where the seat is placed in the end of the post 4, the elevation of the seat carries the seat back from the pedals.

As illustrated, the lower end of the post 4 of the frame is open for the reception of the seat-post 40 when the frame is converted into a lady's frame, and any usual means may be employed to clamp the said seat-post in this position, though I may, if desired, leave the end of the head 60 of the rear fork 7 open for the reception of the said seat-post, in which case it would have the same forward inclination as is shown in Fig. 1.

As illustrated, the seat-post may have the oppositely-extending arms 41 42, to which the seat is attached in usual way, one of the arms being used when the seat is applied to the lady's frame and the other arm being used when the seat is placed in the head 19, as is the case when the frame is used as a gentleman's frame. (See Figs. 1 and 2.)

When it is desired to change the frame of the bicycle from a gentleman's frame to a lady's frame, the handle-bars 11 are removed, when the front fork 9 can be taken out, as readily understood by those familiar with bicycles. The seat-post 40 is then removed from the head 19 and the crank-hanger detached from the position shown in Fig. 1 and attached to the head, as explained above. The frame is then turned bottom side up to the position shown in Fig. 2, when the front fork 9 is replaced in the front head 3 and the handle-bars are attached, when the bicycle-frame has the proper shape for a lady's frame. In this position of the parts the front fork extends in an opposite direction from the head 3 from what it does when the frame is used as a gentleman's frame.

Various modifications may be made in the device without departing from the spirit of my invention.

Having fully described my invention, what I claim as new, and desire to secure by Letters Patent, is—

1. In a bicycle, a frame having a reversible front head adapted to receive the front fork from either direction, said frame having two rear forks, and a detachable crank-hanger adapted to be attached to either fork, whereby the bicycle may be converted into either a gentleman's or lady's bicycle.

2. In a bicycle, a frame having a reversible front head adapted to receive the front fork from either direction, a central post and two rear forks adapted to support the rear wheel, means to attach the seat at either end of said central post, and a detachable crank-hanger adapted to be secured to either rear fork, whereby the bicycle may be converted into either a gentleman's or lady's bicycle at will.

3. In a bicycle, a frame with a reversible front head, whereby the fork may be inserted into the head from either direction, a post substantially parallel to the head, means to attach a seat at either end of said post, a top brace connecting the post and the head, and upper and lower rear forks connected to the post at opposite ends thereof, said forks supporting the rear wheel, and a detachable crank-hanger adapted to be attached to either rear fork, whereby the bicycle may be changed from a gentleman's to a lady's bicycle.

4. In a bicycle, a frame having a front head, a front fork carrying a front wheel supported therein for turning movement, a rear head, and a rear fork having curved ends detachably supported in said rear head, and held therein against turning movement, said rear fork having a rear wheel secured therein.

5. In a bicycle, a frame having a front head, a front fork secured therein for turning movement, a rear head, a rear fork detachably secured therein, said rear fork supporting the rear wheel and having its lower ends curved, each of said forks having the same inclination to a vertical line, and means to hold said rear fork from turning in the rear head.

6. In a bicycle, a frame having a reversible front head adapted to receive the front fork from either direction, said frame having two rear forks, one of which is rigid with the frame, and the other detachable therefrom, and a detachable crank-hanger adapted to be attached to either fork, whereby the bicycle may be converted into either a gentleman's or a lady's bicycle.

In testimony whereof I have signed my name to this specification in the presence of two subscribing witnesses.

LAZARUS S. KALLAJIAN.

Witnesses:
   GEO. W. GREGORY,
   LOUIS C. SMITH.